Oct. 17, 1967     G. F. FELDBAUER, JR     3,347,783
REGENERATION OF INDIVIDUAL MOLECULAR SIEVE COMPARTMENTS
Filed Dec. 1, 1964
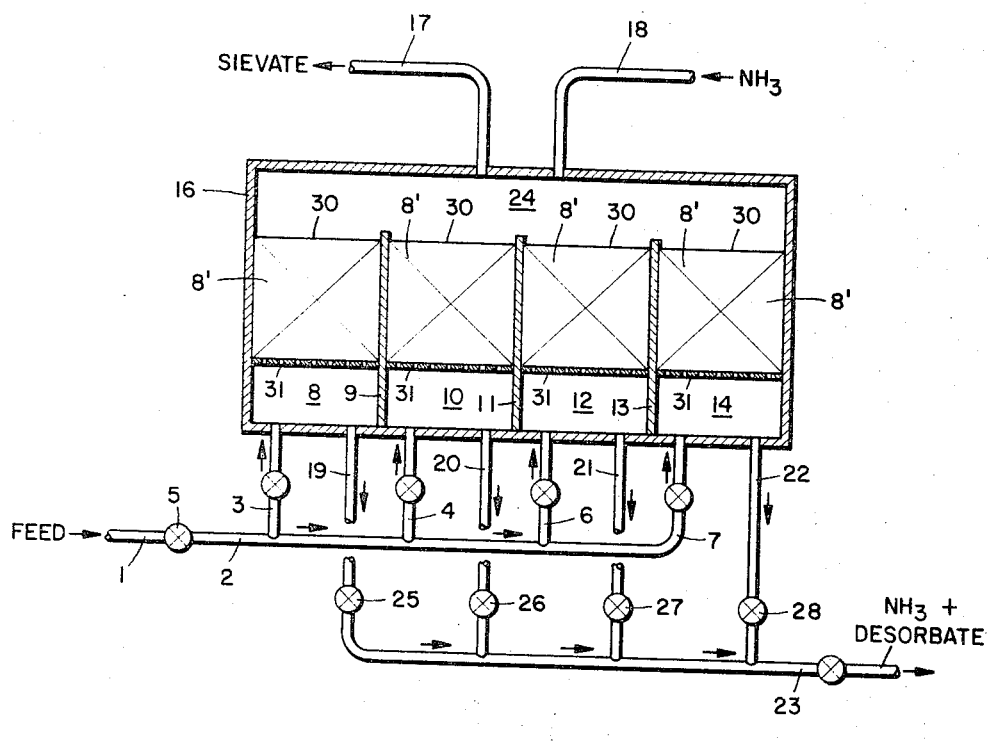
GEORGE F. FELDBAUER, JR. INVENTOR
BY *Perry Carvellas*
PATENT ATTORNEY 3,347,783
REGENERATION OF INDIVIDUAL MOLECULAR SIEVE COMPARTMENTS
George F. Feldbauer, Jr., Cranford, N.J., assignor to Esso Research and Engineering Company, a corporation of Delaware
Filed Dec. 1, 1964, Ser. No. 415,049
12 Claims. (Cl. 208—310)

ABSTRACT OF THE DISCLOSURE

Continuous regeneration of a deactivated molecular sieve separation process bed is accomplished by means of compartmentalizing the molecular sieve bed and subjecting individual compartments to extended stripping with displacing agent while feed introduction into the compartment being regenerated is discontinued. The remainder of the compartments are subjected to traditional adsorption and desorption steps.

---

This invention relates to a regeneration process for adsorbents. More particularly, it relates to a process for regenerating molecular sieves which have lost at least a portion of their adsorptive capacity after prolonged use. It is now well known in the art to make use of molecular sieves in order to separate at least one component of a hydrocarbon containing mixture. The mixture, which contains the adsorbable material is passed over a molecular sieve. The adsorbable component is adsorbed into the sieve and the remainder of the mixture passes out from the sieve as effluent. In order to recover the adsorbable component and restore the sieve so that it may adsorb more adsorbable materials it is necessary to desorb the adsorbed component. This is done by means of a displacing agent which is passed through the bed and serves to displace materials adsorbed by the molecular sieve bed. After many adsorption-desorption cycles, the sieve loses its capacity, that is to say, it does not adsorb adsorbable components as effectively as it did when operations first commenced. It is apparent tha maerials have been adsorbed ino the bed which serve to deactivate it and are not desorbed by means of the standard desorption step which is used to remove adsorbed components. Thus, it is necessary in order to maintain maximum efficiency of the sieve that it be restored in some fashion to its original operating levels. Methods have been suggested but they have one common fallacy, they involve a total shutdown of the molecular sieve separation process.

This invention concerns a method for restoring original or near original adsorptive capacity to a molecular sieve without interrupting the operation of the sieve totally. It has been unexpecedly found according to this invention that by compartmentalizing the molecular sieve and regenerating at least one compartment at a time, while the remaining compartments of the molecular sieve continue to function in their usual fashion, the sieve may be restored to capacity or near capacity adsorptive levels without a total stoppage in the adsorptive cycle.

Each individual compartment is regenerated by passing displacing or regenerating agent through it for an extended period without passing additional adsorbable material over that portion of the sieve. It should be noted that displacing agent and regenerating agent are equivalent terms and may be used interchangeably. About 5 to 500 cycles of displacing agent are passed through the compartment without introducing adsorbable feedstock. Each displacing cycle may last from 8 to 22 minutes, preferably 10 to 20 minutes. In the most preferred form a compartment of the sieve being regenerated is exposed to displacing agent for a total of 60 to 180 minutes in order to completely regenerate it. During this entire period the remaining compartments in the sieve continue on with the normal adsorption-desorption cycle. After the regeneration of one compartment is complete, the adsorption process is restarted and feed is once again allowed to pass into the compartment. The flow of feed to another compartment is stopped and an identical procedure is followed until the entire bed is regenerated.

It has been known for some time that certain zeolites, both naturally occurring and synthetic, have the property of separating normal from isomeric branch chain hydrocarbons as well as cyclic and aromatic mixtures. The zeolites have crystal patterns such as deformed structures containing alarge number of small cavities interconnected by a number of still smaller holes or pores, the latter being of exceptionally uniform size. Only molecules small enough to enter the pores can be adsorbed, though not all molecules, even though small enough to enter the pores will be adsorbed. An affinity of the molecule for the adsorbent must be present. The pores may vary in diameter from 3 to 6 A. units to 8 to 15 or more A. units, but it is a property of these zeolites or molecular sieves that for a particular size the pores are of substantially uniform size. The adsorbents with pore sizes of 8 to 15 A. units have a high selectivity for aromatics and nonnormal hydrocarbons whereas the smaller adsorbents with respect to pore size, that is to say about 3 to 6 A. units, have a higher selectivity for straight chain compounds such as normal paraffins and normal olefins. The adsorbents with pore sizes of 8 to 15 A. units are known as type X sieves.

The scientific and patent literature contain numerous references to the adsorbing action of natural and synthetic zeolites. Among the natural zeolites having this sieve property may be mentioned chabasites and analcite. A synthetic zeolite with molecular sieve properties is described in U.S. Patent 2,442,191. An example of a class of synthetic zeolites which is used to separate normal hydrocarbons from branched hydrocarbons is Type A sieve with divalent cations from the alkaline earth sieves, particularly calcium Type A. These adsorbents are described in U.S. Patent 2,882,243. An example of a class of adsorbents which is used to separate aromatics and nonhydrocarbons from saturates is Type X sieve with monovalent and divalent cations from the alkaline and alkaline earth sieves, particularly sodium and calcium Type X. These adsorbents are described in U.S. Patent 2,882,244. Zeolites vary somewhat in composition but generally contain silica, aluminum, oxygen and an alkali and/or alkaline earth element, e.g., sodium and/or calcium, magnesium, etc. Analcite has the empirical formula: $NaAlSi_2O_6 \cdot H_2O$. Barrer (U.S. Patent 2,306,610) teaches that all or part of sodium is replaceable by calcium to yield on dehydration, a molecular sieve having the formula:

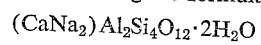
$(CaNa_2)Al_2Si_4O_{12} \cdot 2H_2O$

Black (U.S. Patent 2,522,426) describes a synthetic molecular sieve having the formula:

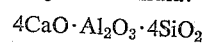
$4CaO \cdot Al_2O_3 \cdot 4SiO_2$

A large number of other naturally occurring zeolites having molecular sieve activity, i.e., the ability to adsorb a straight chain hydrocarbon and exclude the branched chain isomers are described in an article "Molecular Sieve Separation of Solids" appearing in Quarterly Reviews, vol. 3, 293–330 (1949), and published by the Chemical Society (London).

It has been known for some time that various displacing agents could be used to desorb adsorbed material from a molecular sieve. These displacing agents, particularly the small highly polar displacing agents, have been found to be effective in desorbing the adsorbed material. However, after a period of time, usually many adsorption-desorption cycles, the sieve gradually loses its activity. By activity, it is meant the sieve's relative quantitative capacity to adsorb a particular compound. It is not known exactly what causes this lack of activity. Possibly it is caused by poisons in the form of sulfur compounds and the like or alternatively by polymerization, coking or other reactions within the molecular sieve.

Recently, it was discovered that a regenerative step as opposed to a desorption step is most effective in restoring a deactivated sieve to almost its initial capacity. By desorption, it is meant the regular process step or portion of adsorption-desorption cycle wherein adsorbed materials are desorbed from a sieve in order to effect the particular separation desired.

By regeneration, it is meant a situation where the sieve is treated under conditions which differ from and which consequently cause different results than occur in desorption. It is thought that the regeneration process restores a sieve's capacity by removing or otherwise interacting with the sieve to cause removal of very strongly adsorbed material which is not removed by normal desorption.

Conventional means of regenerating an adsorbent including the purging with an inert gas such as nitrogen or methane or treating the adsorbent with steam and high temperatures and burning with oxygen are not always satisfactory. These techniques especially burning are too severe for many molecular sieves and may cause a marked reduction in sieve life.

An earlier, more positive contribution to the art, suggested that the loss in sieve capacity is reversable and is probably due to a very strongly held material. This strongly held material or deposit is sometimes referred to as "heel." Regeneration may take place under a variety of conditions, these conditions differ substantially from the ordinary desorption conditions. A regeneration agent, which is the same as a displacing agent, is passed through the bed under regeneration conditions. This process has met with success with respect to the restoration of the bed to levels of capacity which are near to the level when the bed was first utilized. However, there are drawbacks to this regeneration technique.

Initially, and perhaps most important of all, it is necessary to shut down the bed completely in order to regenerate it. Thus, during the regeneration period all adsorption and desorption must cease. In effect, the utility of the bed is temporarily suspended until after the regeneration period is over. At this time, the bed may once again be utilized. However, with the next regeneration period the utility of the bed is again suspended. Further difficulties are also readily apparent; a separate vessel is needed if one is desirous of continuing his molecular sieve separation. Naturally, this additional vessel will involve greater expense than would the use of a single vessel. Supplemental to this problem is the fact that additional cyclic valves will be needed in order to divert the flow from one bed to another when regeneration is taking place. Cyclic valves are expensive and also provide a variety of maintenance problems. An additional obvious ramification of the problems encountered is the fact that more sieve is needed, the sieve is an expensive commodity and filling several beds with sieve will, of course, entail a great expense.

According to this invention, these disadvantages can be obviated by regenerating continuously rather than intermittently. This is accomplished by means of a compartmented molecular sieve zone such as that shown by the figure subsequently discussed in this application. Each compartment within the molecular sieve separation zone is provided with a separate feed inlet line connected with feed manifold and equipped with a valve which is preferably manual. Regeneration of the sieve in a given compartment is brought about by stopping feed to the compartment for a number of cycles but allowing displacing agent to pass through when the sieve is being desorbed. The various compartments may be regenerated in sequence on any desired time schedule. It is a further feature of this invention to install valves in the displacing agent effluent lines in order to adjust the flow of displacing agent through the bed being rejuvenated. Thus, the theory of this invention concerns the compartmentalizing of a zone into as many compartments as are desired, 2 to 20 or more compartments may be utilized but a preferred number of compartments would be 3 to 10. The flow of feed to one or more of the compartments is halted and the adsorptive capacity of a small portion of the bed is interrupted. However, the remainder of the bed which is usually the majority of its surface area may still be operated and adsorption continues as usual. When desorption is to take place, the flow of displacing agent passes through the compartments which have been closed to feed in the same manner as displacing agent passes through the compartments which have received the feed. In this fashion, the various closed off compartments in the course of several cycles will receive a considerable amount of displacing agent but not be exposed to any additional adsorbable material. This continued exposure to displacing agent causes the undesired "heel" to be removed from the surface of the sieve and the remainder of the sieve continues to operate during the regeneration period.

The attached figure is a schematic view of a preferred configuration for carrying out the process of the invention.

The numeral 16 designates a molecular sieve separation zone. The sieve may be the A type when it is desired to separate normal paraffins from virgin, cracked or reformed naphthas, distillates or gas oils. Alternatively, the sieve may be the X or Y type when it is desired to separate aromatics or polar impurities from such feedstock. Feed is introduced through line 1, passes through cyclic valve 5 and into line 2. The molecular sieve zone 16 has been compartmentalized into four separate compartments, each compartment containing approximately ¼ of the total molecular sieve. The compartments are designated as 8, 10, 12 and 14. Within each compartment is about ¼ of the 5 A. sieve 8' contained in zone 16. There is positively no criticality with respect to the number of compartments utilized; for convenience sake about 3 to 10 number of compartments is preferred, however, any number of compartments greater than one may be utilized. Returning to the feed, after passing through valve 5 feed passes into line 2, from line 2 it passes into valved lines 3, 4, 6 and 7 which directs a portion of the feed into compartments 8, 10, 12 and 14 respectively. Walls 9, 11 and 13 separate the various compartments. The numeral 30 represents the top of sieve bed 8 and may consist of a suitable mesh screening means. Numeral 31 is a suitable perforated grid plate which forms the bottom of vessel 16 and supports the catalyst 8'. Plenum chamber 24 is not compartmented. The sievate passing out on adsorption is directed to line 17. The displacing agent, which in this case is ammonia, enters sieve bed 16 through line 18, the ammonia enters compartments 8, 10, 12 and 14 where it serves to desorb the adsorbed component from sieve 8', if it is desirous that the sieve be a 5 A. sieve the adsorbed component would be a normal paraffin, if the sieve is a 13X sieve the adsorbed component would be an aromatic. Desorbate leaves compartment 8 through line 19 and check valve 25, compartment 10 through line 20 and check valve 26, compartment 12 through line 21 and check valve 27, and compartment 14 through line 22 and check valve 28. All these lines converge into line 23 from whence the desorbate and ammonia is removed. Check valve 25, 26, 27 and 28 allow flow only toward line 23. Maximum working capacity of the sieve bed can be maintained by regenerating continuously the sieve in one or more compartments. This is done in accordance with the instant invention and the bed is regenerated in a manner such that at least a part of the bed continues regular adsorption-desorption cycles. In this instance, valved line 7 which leads to section 14 is closed so that no further feedstock is introduced into section 14. Feed is introduced into the bed and passes into chambers 8, 10 and 12. After this ammonia is passed into bed through line 18 and into compartments 8, 10, 12 and 14. Thus, compartment 14 is not exposed to any feed but is exposed to ammonia. This process is continued for a number of cycles until compartment 14 has been regenerated. The number of cycles required will depend on conditions and may range from 1 to 100 or more. In the same fashion, compartments 8, 10 and 12 are restored to their initial capacity. This is done while alternately closing the flow through lines 3, 4 and 6. As is plainly obvious, two sections may be regenerated at once or even three if it is so desired. The preferred embodiment of the invention would involve restoring one compartment at a time.

The conditions of the adsorption-desorption are not critical to this invention. However, it should be duly noted for adsorption temperatures would range from 200° to 1000° F., preferably 500° to 800° F., most preferably 600° to 750° F. With respect to pressures, pressures of 1 to 300 p.s.i.a. are preferred, pressures of 5 to 100 p.s.i.a. are more desirable and the most preferred pressures are 10 to 60 p.s.i.a. The feed rate should be between 0.1 to 100 w./w., the preferred rate would be 0.5 to 10 w./w. The rate of introducing displacing agent should be .01 to 10 w./w., preferably .05 to 1 w./w. The preferred number of cycles for regeneration should be 5 to 500, the most preferred number of regeneration or displacement cycles is 5 to 50. By displacing cycles it is meant the number of times displacing agent is passed through the given compartment without introducing any fresh feed into the particular compartment. Each cycle lasts from 8 to 30 minutes, preferably 10 to 20 minutes.

The displacing agent utilized may vary within a wide scope but it is preferably a small polar molecule.

The displacing agent is defined as a polar or polarizable material having an appreciable affinity for the zeolitic adsorbent compared with the material desired to be desorbed. The displacing agent will generally have a heat of desorption approximately equal to the material it is desired to desorb. Displacing agents are also referred to as desorbents, displacing agents and desorbing mediums. Suitable displacing agents for the process of this invention include $SO_2$, ammonia, carbon dioxide, $C_1$ to $C_5$ alcohols such as methanol and propanol, glycols such as ethylene glycol and propylene glycol, halogenated compounds such as methyl chloride, ethyl chloride, methyl fluoride, nitrated compounds such as nitromethane, and the like. Preferably, the displacing agents are used in a gaseous state. A preferred displacing agent has the general formula:

wherein $R_1$, $R_2$ and $R_3$ are selected from the group consisting of hydrogen and $C_1$ to $C_5$ alkyl radicals.

Thus, the desorbing material includes ammonia and the $C_1$ to $C_5$ primary, secondary and tertiary amines with ammonia being preferred and the $C_1$ to $C_5$ primary amines being next in order of preference. Examples of preferred primary amines include ethylamine, methylamine, butylamine and the like. Of course the displacing agent used must have its critical dimension small enough to enter the molecular sieve being used.

*Example*

In a specific example of this invention the vessel containing the molecular sieve bed 16 is 240 inches in width and about 96 inches in height. It is divided into four compartments by a series of three walls which in the drawing are designated as 9, 11 and 13. The walls are 0.125 inch in thickness and 72 inches in height which means they do not extend for the entire height of sieve bed vessel 16. Each compartment is about 60 inches in width. The sieve utilized in the molecular sieve zone 16 is a 5 A. molecular sieve. A feed stream which is a distillate containing $C_{10}$ to $C_{14}$ n. paraffins and other hydrocarbons is introduced through line 1 and passes through line 2 and into lines 3, 4, 6 and 7 and from there to compartments 8, 10, 12 and 14. The sievate which is essentially free of normal paraffins is removed through line 17. The displacing agent which is ammonia is introduced through line 18 and serves to displace normal paraffins from the compartments 8, 10, 12 and 14. The normal paraffins and ammonia are removed through lines 19, 20, 21 and 22 from whence they pass into line 23 and out of the system. Average operating conditions during the operation of the system are as follows:

Adsorption:
    Temperature, ° F. _____ 675
    Pressure, p.s.i.a. _____ 20
    Feed rate, w./w./hr. _____ 0.6
    Time, minutes _____ 20
Desorption:
    Temperature, ° F. _____ 675
    Pressure, p.s.i.a. _____ 20
    Ammonia feed rate, w./w./hr. _____ 0.26
    Time, minutes _____ 20

The system is operated continuously for a period of 434 adsorption-desorption cycles. During this time, the capacity of the adsorbent declines so that the amount of effluent that could be obtained before significant breakthrough of normal paraffins decreases from .25 weight of effluent per weight of adsorbent to .16 weight of effluent per weight of adsorbent. This is measured chromatographically.

At the end of the 434th cycle, valve 7 is closed and the cycle is continued with no feed being introduced into compartment 14 but ammonia is allowed to pass through this system during a displacing cycle. This is continued for a period of 6 cycles or 120 minutes of exposure to displacing agent. At the end of this time, valved line 7 is opened and valved line 6 is closed and the process is repeated for the same number of cycles. Then the regeneration process is again repeated, valved line 4 is closed and bed 10 is regenerated in the same fashion as 14 and then valved line 4 is opened and valved line 3 is closed and section 8 is regenerated. All of the sections are exposed to 6 cycles of ammonia during regeneration. After all four sections are regenerated, it is discovered by means of chromatographic testing that the bed has returned to 98% of its original capacity.

The utility of this invention is readily apparent, now an adsorbent bed can be regenerated without having a complete shutdown in its operation. In fact, the majority of the benefit achieved by its operation can be retained while it is being regenerated a small fraction at a time.

This invention is to be limited only by the attached claims and not to the previously described specification.

What is claimed is:

1. In a molecular sieve separation process wherein a feedstock, at least a portion of which is adsorbable, is passed through a molecular sieve separation zone whereby the said adsorbable portion is adsorbed onto the molecular sieve, halting the flow of said feedstock, then desorbing the said adsorbed component by means of a displacing agent and the cycle continued until the said molecular sieve contains a deactivating amount of a strongly adsorbed contaminant which serves to reduce its adsorptive capacity, the improvement which comprises compartmentalizing the said molecular sieve bed, halting the flow of feed to at least one of the said compartments in the said molecular sieve bed zone while passing feed into the remaining compartments to adsorb the adsorbable components of the feed in said beds, passing the said displacing agent through all of said compartmentalized zones and continuing this procedure for at least 5 cycles until the deactivating amount of contaminant is removed.

2. The process of claim 1 wherein the said temperature of said molecular sieve zone is maintained at 500° to 1000° F. during the entire process.

3. The process of claim 1 wherein the said adsorbent is a type A molecular sieve and the said adsorbable component of the said feedstock is a normal paraffin.

4. The process of claim 1 wherein the said adsorbent is a type X molecular sieve and the said adsorbable hydrocarbon is an aromatic hydrocarbon.

5. The process of claim 1 wherein the feed flow is halted for 5 to 50 displacement cycles in at least one of the said compartments in the said molecular sieve zone.

6. The method according to claim 1 wherein said displacing agent has the formula:

wherein $R_1$, $R_2$ and $R_3$ are selected from the group consisting of hydrogen and $C_1$ to $C_5$ alkyl radicals.

7. The method of claim 1 wherein the said displacing agent is ammonia.

8. In a process for separating hydrocarbon from a mixture in which it is contained by adsorbing the said hydrocarbon onto a molecular sieve halting the flow of hydrocarbon and then desorbing the said hydrocarbon by means of a displacing agent wherein the said molecular sieve is periodically regenerated when it contains a deactivating amount of contaminant the improvement which comprises compartmentalizing the molecular separation zone, halting the flow of hydrocarbon containing mixture to at least one of said compartments thereby halting the adsorption process in said compartment or compartments, continuing to pass displacing agent through all of said compartments during the said desorption cycle and repeating this process for a period of 5 to 50 displacement cycles until the said compartment or compartments are restored to near their original activity level.

9. The process of claim 1 wherein the said adsorbable hydrocarbon is a normal paraffin and the said molecular sieve is a 5 A. molecular sieve.

10. The process of claim 8 wherein the said molecular sieve is a type X molecular sieve and the said adsorbable hydrocarbon is an aromatic hydrocarbon.

11. The process of claim 8 wherein the said displacing agent is ammonia.

12. A molecular sieve separation process wherein a hydrocarbon mixture at least a portion of which is adsorbable onto a molecular sieve is passed through a molecular sieve separation zone, whereby the said adsorbable portion is adsorbed onto said molecular sieve and the remainder of the mixture passes out of the said zone as an effluent, halting the flow of hydrocarbon mixture then desorbing the said adsorbed component by means of a displacing agent and continuing this process for several cycles until the said molecular sieve contains a deactivating amount of nondesorbable contaminant, the improvement which comprises compartmentalizing the said molecular sieve separation zone, halting the flow of hydrocarbon mixture to at least one of the said compartments but continuing the adsorption process within the remaining compartments of the molecular sieve zone, continuing to pass displacing agent during desorption through all of said compartments and repeating this process for 5 to 50 displacement cycles until the said deactivating contaminants are removed substantially from the said compartment or compartments to which the flow of feed during adsorption has been stopped, resuming the flow of feed to the said regenerated compartment, halting the flow of feed to at least one of the other non-regenerated compartments, continuing to pass displacing agent during the said desorption step through all of said compartments and repeating this process until the said deactivating contaminants are substantially removed, and continuing this process until all of the compartments of the said molecular sieve separation zone have been regenerated.

References Cited

UNITED STATES PATENTS

| 2,881,862 | 4/1959 | Fleck et al. | 260—676 |
| 2,938,864 | 5/1960 | Fleck et al. | 208—310 |
| 2,996,558 | 8/1961 | Feldbauer | 260—676 |
| 3,131,232 | 4/1964 | Broughton et al. | 260—676 |
| 3,201,491 | 8/1965 | Stine et al. | 208—310 |

DELBERT E. GANTZ, *Primary Examiner.*

HERBERT LEVINE, *Examiner.*